June 22, 1965  A. R. RAUSING  3,190,441
DOUBLE-WALLED END-SEALED CONTAINER
Filed May 4, 1961
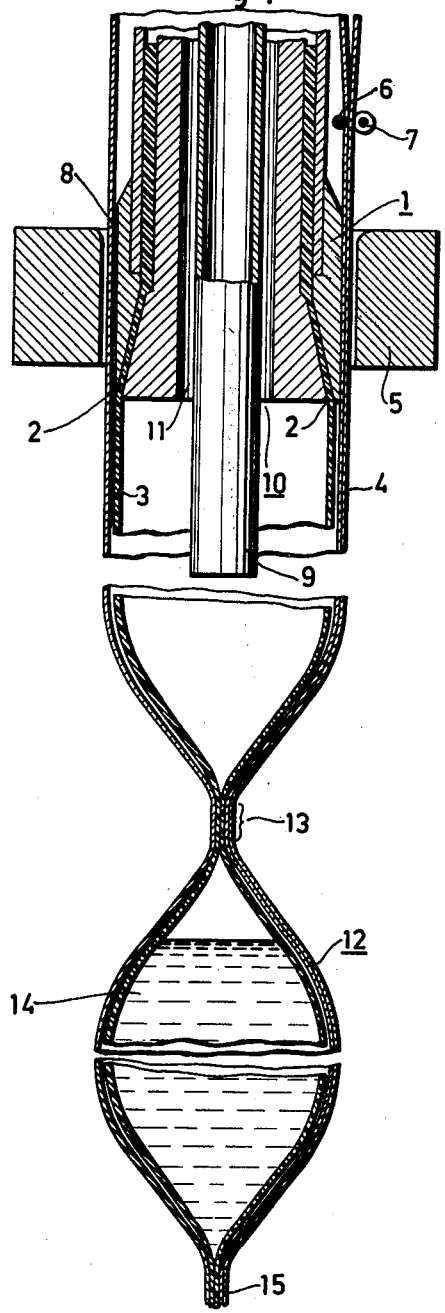
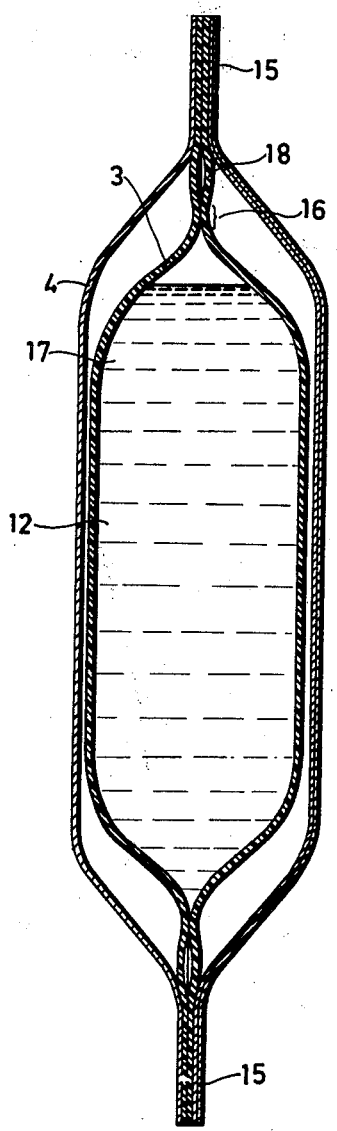
INVENTOR
Anders Ruben Rausing
By 3,190,441
DOUBLE-WALLED END-SEALED CONTAINER
Anders Ruben Rausing, Simontorps Sateri,
Blentarp, Sweden
Filed May 4, 1961, Ser. No. 107,749
Claims priority, application Sweden, May 4, 1960,
4,403/60
1 Claim. (Cl. 206—46)

The present invention relates to a liquid-filled sealed package of the kind produced through flat-pressing and heat-sealing a tube element along two relatively narrow zones, one at each end of the tube element, for enclosing a filling material quantity introduced therein, said tube element comprising an inner seamless thermoplastic tube length of substantially uniform wall thickness and an encircling longitudinally seamed and preferably body-serving sleeve of equal length and similarly of substantially uniform wall thickness.

Packages of this general type are known and are produced from a tube the outer sleeve body of which comprises a web of paper, cardboard or other suitable packaging material bent into sleeve shape and having its two longitudinal edges joined to each other in a butt joint relationship imparting a substantially uniform wall thickness to the sleeve. Similarly, the inner plastic tube is of substantially uniform wall thickness and is assumed to be laminated to the inside surface of the sleeve body.

Although this prior package due to its continuous plastic lining formed by the plastic tube and to the substantially uniform wall thickness of the composite tube from which the package is produced of course out of tightness point of view is by far superior to similar packages produced from tubes the plastic linings of which are not entirely continuous and/or the wall thicknesses of which are not uniform along the entire tube periphery, it is, nevertheless, not quite satisfactory in certain respects. The plastic lining being laminated to the inside surface of the body, already during the package forming operation and above all when handling the finished package it will be subjected to the same stresses as the body proper. In its laminated state the plastic lining, which is thin out of cost reason just to mention one reason therefor, in absorbing said stresses will have to participate in the deformation displacement of the body in many cases tending to cause local ruptures in the plastic lining due to stresses that by no means would have been disastrous had they affected only the plastic lining.

A further drawback is that the lamination of the plastic lining to the sleeve body inside may cause minor perforations in the plastic lining, if the sleeve inside is of a relatively "raw" texture. This risk is particularly pronounced in cases where the plastic tube is extruded inside the outer sleeve and is applied to the inside surface thereof in at least a semi-molten state.

The inconveniences referred to are avoided by the package according to the invention through the fact that the lining formed by the plastic tube length is secured to the body inside substantially only in said two flat-pressing zones.

As the plastic lining except for the transverse sealing fins of the package is loose with respect to the body it is better suited to resist the stresses set-up during the package forming operation and in the normal handling of the package. The reason is that the stresses even if attacking locally will be distributed along the entire free length between the fixing points. In this connection it is also to be noted the important feature that in a substantially loose lining the stress-equalizing property of the filling material may be utilized in a better way. Another important fact is that almost inevitably air will be trapped between body and lining along those portions thereof not secured to each other, said air "lubricating" the region of engagement between body and lining and, furthermore, to some extent contributing to distribution of stresses locally attacking the body outside over a larger area of the lining.

A further feature of the package according to the invention is that, at least in one of its embodiments, it has its plastic lining sealed off at its both ends at a point inwardly offset from the respective transverse joint between body and lining. Through this feature there is gained the advantage that the two transverse seals will be released from the seal breaking effect caused by the filling material quantity enclosed in the plastic lining.

The invention also relates to a method of producing the packages in question. Such method is based upon the known process of a downward direction by an extruder head having an annular extruding nozzle and a central filling material supply passage extruding a plastic tube of substantially uniform wall thickness. About the tube and from a suitable packaging web material there is formed a longitudinally seamed sleeve of substantially uniform wall thickness and of an inner diameter substantially corresponding to the outer diameter of the plastic tube, thereby to form a composite tube. To the interior of said composite tube there is supplied a material to be packaged through the supply passage of the extruder head and, through flat-pressing and heat-sealing along narrow zones transverse to the tube axis, the tube is divided into filled and sealed packages finally to be separated from each other through severing cuts in the flat-pressing zones. In accordance with the invention the extrusion is carried out under such conditions as substantially to avoid adhesion to the sleeve inside, the transverse sealing being effected in such a way as simultaneously to make the plastic tube adhere to the sleeve in the flat-pressing zone.

Because the plastic tube is extruded downwardly into the outer sleeve without adhesion to the inside surface thereof, by the method according to the invention there is gained the advantage that the forming of the outer sleeve may be intermittent, if desired, the extrusion of the plastic tube being carried out in a continuous manner as necessary for securing a uniform wall thickness in the plastic tube. Of course, the extrusion rate is adapted to the sleeve forming operation so that the plastic tube length extruded during a sleeve dwell period and a sleeve forming period will equal the outer sleeve length obtained during said sleeve forming period.

As for the transverse sealing, measures must be taken for ensuring that in the flat-pressing zones not only the securing of the plastic tube to the sleeve will be effected but also the sealing-off of the plastic tube. The tube does not necessarily need to be secured to the sleeve using the plastic tube material as an adhesive but the securing might as well be carried out as a normal gluing operation using a separate binding agent preferably pre-applied to the corresponding portion of the sleeve inside.

In any case the sealing-off of the plastic tube is carried out through supplying heat to the sealing zone or region. The sealing heat is transferred by the flat-pressing means which to this end may be constantly heated; carry suitable impulse heating means, e.g. thin direct-heated resistance strips, on their working surface; or in themselves comprise electrodes of a high frequency heating system. High frequency heating may only be used with plastic materials having adequate dielectric properties.

As mentioned above in connection with the discussion of the package proper of the invention, it may further the resistance and tightness of the package to seal off the inner plastic lining at a point inwardly offset from the respective transverse bond between body and lining. In the above method this is effected through, in each flat-pressing zone and during the tube dividing operation, carrying out a transverse sealing operation only affecting the plastic tube on both sides of a transverse seal at least securing the plastic tube to the sleeve but preferably also sealing off the plastic tube along the corresponding region thereof.

When flat-pressing and sealing the composite tube, the uniform wall thickness thereof is of great importance as it makes possible a uniform sealing pressure along the entire sealing zone without necessitating complicated sealing jaw construction. Similarly, the uniform tube wall thickness will, of course, facilitate the heat supply during the heat-sealing operation which is particularly noticeable when high frequency sealing where electrode surfaces parallel to each other create a high frequency field of the most suitable configuration.

By way of introduction, it was mentioned above that the longitudinal seam of the outer sleeve may be of butt joint type to impart uniform wall thickness to the sleeve. However, the edges of the web forming the sleeve might as well be joined to each other in over-lapping relationship or even inside face to inside face and the fin like joint in the latter case being folded to lie against the outside face of the sleeve, if the corresponding margins have such cross sectional shape that the resulting longitudinal seam will not substantially increase the sleeve wall thickness.

In the following the invention will be described in greater detail, reference being made to the accompanying drawing in which FIG. 1, in axial section, illustrates the method according to the invention as applied to the production of pillow-shaped packages, and FIG. 2, in axial section, shows the end seal fin and the adjacent portions of the package according to the invention in one embodiment thereof.

With reference to FIG. 1, in a downward direction there is extruded a plastic tube 3 out of an extruder head 1 having an annular extruding nozzle 2.

About the extruder head a packaging web material, e.g. of paper, is formed into a longitudinally seamed sleeve 4 surrounding the plastic tube 3, the lower portion of the extruder head 1 together with an outer annulus 5 serving as a sleeve forming means. Above such means there has, by an inner pressure roller 6 and an outer counter pressure roller 7, been indicated a longitudinally seaming means effecting a joining of the longitudinal margins of the web material into a longitudinal seam in the sleeve 4.

The inside surface of the longitudinally seamed sleeve 4 engages the radially outer circumference of the lower portion of the extruder head 1. The extruding nozzle 2 is co-axial with said outer circumference and is arranged to extrude a tube 3 having an outer diameter slightly less than the inner diameter of the surrounding sleeve 4.

In order to prevent vacuum in the annular space between the sleeve 4 and the tube 3 from causing the latter to engage the sleeve inside while still having "blocking" property, the outer circumferential surface of the extruder head engaged by the sleeve 4 is provided with grooves 8 parallel to the tube and sleeve axes and by which said annular space communicates with the ambient atmosphere.

Centrally in the extruder head 1 and co-axial with the nozzle 2 thereof there is inserted a filling pipe 9 the lower end of which is below the extruder head 1 while its upper end is connected to a source of filling material to be packaged. The outside surface of the filling pipe 9 and the inside of that central passage 10 through which the filling pipe 9 is inserted through the extruder head 1 define an annular channel 11 by means of which the interior of the tube 3 communicates with either the ambient atmosphere or a source of gas for controlling the inner pressure of the tube 3.

At a level below the extruder head 1 the composite tube formed by the plastic tube 3 and the sleeve 4 is divided into pillow-shaped packages 12 through flat-pressing and heat-sealing along narrow zones 13 transverse to the tube axis. In the present case the heat-sealing in such zones 13 is assumed to cause the tube 3 thereat on one hand to be secured to the inside of the sleeve 4, on the other hand is sealed off along its inside.

In the interval between two successive transverse sealing operations in the zones 13 there is, through the filling pipe 9, supplied a filling material quantity 14 corresponding to the package in question. The filling material supply may be either intermittent or continuous, the dividing of the composite tube 3, 4 into packages in the latter case necessitating a simultaneous pinching-off of the filling material flow in the interior of the tube 3.

In the finished package 12 the lining formed by the plastic tube 3 is secured to the inside of the envelope formed by the sleeve 4 only in the end seal fins 15 obtained through severing cuts in the sealing zones 13 between successive packages 12. The lining and the envelope thus may be said to define a gas filled jacket between themselves.

FIG. 2 illustrates a package according to the invention having its plastic tube 3 sealed-off also along a zone 16 inwardly offset from the end seal fin 15 so that portion of the lining corresponding to the cavity 17 is freely "suspended" inside the envelope by two webs 18.

I claim:

A liquid-filled sealed package of the kind produced through flat-pressing and heat-sealing a double wall tube element along two relatively narrow substantially transverse zones, one at each end of the tube element, for enclosing a filling material quantity introduced therein, said tube element comprising an inner seamless thermoplastic tube of substantially uniform wall thickness and an encircling longitudinally seamed body-serving outer tube of the same length as said inner tube and also of substantially uniform wall thickness, said outer tube being spaced from said inner tube except at said transverse seal zones, characterized therein that said inner tube at the two ends of the package, is further sealed off along a substantially transverse zone offset inwardly from the respective transverse seals between said inner and outer tubes.

References Cited by the Examiner

UNITED STATES PATENTS

| | | | |
|---|---|---|---|
| 2,154,521 | 4/39 | Maxfield | 53—27 |
| 2,257,823 | 10/41 | Stokes | 53—27 |
| 2,430,995 | 11/47 | Roos. | |
| 2,728,450 | 12/55 | Haire | 206—46 |
| 2,735,543 | 2/56 | Trow | 206—56 |
| 2,751,072 | 6/56 | Ditmar | 206—46 |
| 2,785,795 | 3/57 | Ryno | 206—46 |
| 2,898,027 | 8/59 | Scholle | 229—14 |
| 2,962,843 | 12/60 | Hoelzer | 229—55 X |

THERON E. CONDON, *Primary Examiner.*

RICHARD J. HOFFMAN, EARLE J. DRUMMOND,
*Examiners.*